2,998,449
PREPARATION OF SUBSTITUTED BORAZOLES
Stanley F. Stafiej, Stamford, Conn., assignor to American Cyanamid Company, New York, N.Y., a corporation of Maine
No Drawing. Filed May 27, 1959, Ser. No. 816,043
5 Claims. (Cl. 260—551)

This invention relates to a method of producing certain compounds comprising boron and nitrogen, and more especially is concerned with a method of preparing a particular class of borazoles. Still more particularly, the invention relates to a new and improved method of producing borazoles represented by the general formula I 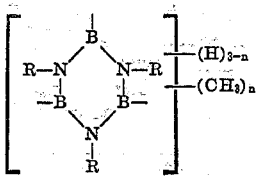

where R represents a member of the class consisting of aromatic hydrocarbon radicals, nuclearly halogenated aromatic hydrocarbon radicals and nuclearly alkoxy-substituted aromatic hydrocarbon radicals, and $n$ represents a number from 1 to 3, inclusive. The radicals represented by R may be the same or different.

Briefly described, the method of the present invention comprises effecting reaction between (1) a borazole represented by the general formula II 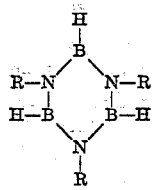

where R has the same meaning as given above with reference to Formula I, and (2) diazomethane in a molar amount represented by $n$ where $n$ represents a number from 1 to 3, inclusive. The number of moles of diazomethane represented by $n$ can be more than 3, in which case there is present a molecular excess of this reactant. When a maximum yield of the B-trimethyl-substituted borazole is desired, the borazole reactant of (1) and the diazomethane reactant of (2) are employed in a molar ratio of 1 mole of the former to at least 3 moles of the latter, preferably more than 3 moles of the latter, e.g., from 4 to 5 or more moles thereof. Similarly, when it is desired to obtain a maximum yield of the B-monomethyl- or of the B-dimethyl-substituted borazole the molar equivalents of diazomethane are preferably in excess, e.g., about 30% to 70% in excess of that theoretically required. This excess seems to be desirable in order to obtain maximum yields because of the consumption of some of the diazomethane in forming polymethylene as a side reaction product.

The reaction between the borazole and diazomethane reactants is effected (as by contacting together) in an inert liquid medium at a temperature below about $-50°$ C., e.g., at from about $-55°$ C. to about $-70°$ C. or $-80°$ C. The use of even lower temperatures is not precluded.

The reaction may be effected at atmospheric or superatmospheric pressure. It is carried out under anhydrous (substantially completely anhydrous) conditions. The liquid medium in which the reaction is effected is an anhydrous (substantially completely anhydrous), liquid medium which is inert during the reaction; that is, one which is inert (non-reactive) toward the reactants and the reaction product during the reaction period. By "substantially completely anhydrous" liquid medium is meant one which contains no more than a trace of water or the amount of water that might be present in the commercial product. Illustrative examples of such liquid media (solvents or diluents) are dimethyl ether, diethyl ether, di-n-propyl ether, di-isopropyl ether, di-n-butyl ether, di-n-amyl ether, butyl methyl ether and tetrahydrofuran.

When the $n$ number of moles of diazomethane is less than 3, then the reaction of the said compound with the B—H borazole reactant results in partial substitution of hydrogen atoms by methyl radicals on the borazole ring, giving the B-monomethyl- and B,B'-dimethyl-substituted borazoles as the main products. Some B,B',B''-trimethyl-substituted borazole may also be formed and be present in the reaction mass, the amount thereof (in general) being the greater the more closely the number of moles of diazomethane approaches 3.

For certain purposes, the reaction mass containing the partially B-methylated borazole reaction product can be used as such (e.g., as an intermediate for reacting with Grignard reagents to make other chemical products) without isolating therefrom the borazole reaction product of the method. Thus, the partially B-methylated borazoles can be reacted with a Grignard reagent to introduce a different hydrocarbon substituent into the borazole nucleus. Generally, however, the small amount of polymethylene formed as a side reaction product is filtered off and the borazole reaction product is isolated from the filtrate by known, conventional methods of isolation, including removal of the solvent by distillation, and purification of the crude, residual reaction product, e.g., by crystallization, etc.

Illustrative examples of radicals represented by R, where it appears in the above formulas, are phenyl, biphenylyl or xenyl, naphthyl, anthryl, dianthryl, naphthyl-substituted anthryl and dianthryl, etc.; tolyl, xylyl, ethylphenyl, propylphenyl, isopropylphenyl, butylphenyl, etc.; and the mono-, di-, tri-, etc., nuclearly halogenated (chlorinated, brominated, fluorinated and iodinated) and mono-, di-, tri-, etc., nuclearly alkoxy-substituted aromatic hydrocarbon radicals named above by way of example. The individual alkoxy substituent can contain, for example, from 1 to 5 carbon atoms or, in some cases, as many as 18 or more carbon atoms.

The present invention provides a new and improved method of producing B-methyl-substituted borazoles of the kind embraced by Formula I. Previously, B—H borazoles have been methylated by equilibrating with $B(CH_3)_3$ in a high-vacuum apparatus. The method of the instant invention has the advantage of simplicity and avoids the necessity for using high-vacuum techniques. Furthermore, it makes possible better control of the number of —$CH_3$ groups that can be introduced onto the borozole nucleus. Such control was not possible by the prior methylation technique.

In order that those skilled in the art may better understand how the present invention can be carried into effect, the following examples are given by way of illustration and not by way of limitation. Examples 1 to 5, inclusive, illustrate the preparation of typical B—H borazole reactants. The remaining examples illustrate the preparation of typical B-methylated borazoles by the method of the invention. All parts and percentages are by weight unless otherwise stated.

EXAMPLE 1

*Preparation of N-tri-p-anisylborazole*

In a three-necked, 500 ml. flask, equipped with a stirrer, a water-cooled condenser and Drierite-filled drying tube, is placed 2.0 g. (0.05 mole) of lithium aluminum hydride and 150 ml. of diethyl ether. To the stirred mixture is added, portionwise, 14.0 g. (0.03 mole) of B-trichloro-N-tri-p-anisylborazole, followed by 50 ml. of ether. The reaction mass is stirred under gentle reflux for 3.5 hours and, after being cooled to room temperature, is decomposed with a saturated aqueous solution of ammonium chloride. The insoluble, inorganic, solid material is removed by filtration, and the clear filtrate is evaporated to dryness. The solid residue is recrystallized from hexane to give 6.7 g. (66% of the theoretical) of product with M.P. 133–139° C. Two additional crystallizations from hexane give the analytical sample of N-tri-p-anisylborazole, M.P. 139–140° C.

*Analysis.*—Calc'd. for $C_{21}H_{24}O_3N_3B_3$, percent: C, 63.23; H, 6.06; N, 10.58; B, 8.14. Found, percent: C, 63.37; H, 6.39; N, 10.33; B, 7.96.

EXAMPLE 2

Preparation of N-tri-p-bromophenylborazole

B-trichloro-N-tri-p-bromophenylborazole (30.0 g., 0.05 mole) is placed with 200 ml. of ether in a one-liter, three-necked flask equipped with stirrer and condenser, the outlet of which is protected against moisture. To the stirred mixture is added solid lithium aluminum hydride (2.5 g., 0.066 mole), causing a mild exothermic reaction. After being gently refluxed for two hours, the reaction mass is cooled and then titrated with a saturated aqueous solution of ammonium chloride, filtered, and the insoluble residue is washed with ether. The clear filtrate is evaporated to dryness and the solid residue, after recrystallization from hexane-chloroform, gives 1.2 g. of product, M.P. 224–232° C.

The ether-insoluble solids obtained from the ammonium chloride titration are washed several times with chloroform. On concentrating the chloroform washings, a crystalline solid comprising N-tri-p-bromophenylborazole is deposited in two crops. Weight; 11.1 g. with M.P. 233–236° C. The analytical sample of N-tri-p-bromophenylborazole, obtained after three recrystallizations from chloroform-hexane, has M.P. 234–235° C.

*Analysis.*—Calc'd. for $C_{18}H_{15}N_3B_3Br_3$, percent: C, 39.63; H, 2.77; N, 7.70; B, 5.95; Br, 43.95. Found, percent: C, 39.47; H, 3.17; N, 7.78; B, 5.73; Br, 43.77.

EXAMPLE 3

Preparation of N-tri-m-tolylborazole

B-trichloro-N-tri-m-tolylborazole is reduced with lithium aluminum hydride in the manner described under Examples 1 and 2. The product, N-tri-m-tolylborazole, is purified by recrystallization from hexane (61% yield). The M.P. of the analytical sample is 165.5–166.5° C.

*Analysis.*—Calc'd. for $C_{21}H_{24}N_3B_3$, percent: C, 71.88; H, 6.89; N, 11.98; B, 9.25. Found, percent: C, 71.93; H, 6.99; N, 11.96; B, 9.27.

EXAMPLE 4

Preparation of N-tri-m-bromophenylborazole

The above-named compound is obtained as described above from B-trichloro-N-tri-m-bromophenylborazole by reduction with $LiAlH_4$. The M.W. of the analytical sample, obtained by recrystallization from hexane, is 125.0–125.4° C.

*Analysis.*—Calc'd. for $C_{18}H_{15}N_3B_3Br_3$, percent: C, 39.63; H, 2.77; N, 7.70; B, 5.95. Found, percent: C, 39.03; H, 2.96; N, 7.72; B, 6.41.

EXAMPLE 5

Preparation of N-tri-p-tolylborazole

From the reduction of 70 g. (0.154 mole) of B-trichloro-N-tri-p-tolylborazole with 5.0 g. (0.132 mole) of lithium aluminum hydride, there is obtained 43 g. (80% of theory) of N-tri-p-tolylborazole, M.P. 150–153° C. Three recrystallizations from hexane give the analytical sample, M.P. 150–152° C.

*Analysis.*—Calc'd. for $C_{21}H_{24}N_3B_3$, percent: C, 71.88; H, 6.89; N, 11.98; B, 9.25. Found, percent: C, 71.91; H, 6.97; N, 11.78; B, 9.33.

EXAMPLE 6

Preparation of B-methyl-N-triphenylborazole

To a stirred solution of 3.08 g. (0.01 mole) of N-triphenylborazole in 200 ml. ether, held at −78° C., is added 32 ml. of a 0.32 molar ethereal solution of diazomethane (i.e., 0.01 mole) over a period of 45 minutes. The yellow reaction mass is allowed to stand for 40 hours, after which time the yellow color has disappeared. It is then permitted to warm to room temperature (20°–30° C.). The ether is evaporated from the clear, colorless filtrate under reduced pressure, leaving a slightly yellow-colored residue, M.P. 123–128° C. Recrystallization from hexane gives 2.41 g. (72% of theory) of B-methyl-N-triphenylborazole (B - monomethyl - N - triphenylborazole) in two crops. The M.P. of the first crop is 138°–141° C.; and the second crop, 122°–137° C. An analytically pure sample shows:

*Analysis.*—Calc'd. for $C_{19}H_{20}N_3B_3$, percent: C, 70.68; H, 6.24; N, 13.02. Found, percent: C, 70.62; H, 6.35; N, 12.70.

EXAMPLE 7

Preparation of B-methyl-N-tri-p-chlorophenylborazole

Instead of 0.01 mole of N-triphenylborazole as in Example 6, there is used 0.01 mole of N-tri-p-chlorophenylborazole to obtain a good yield of B-methyl-N-tri-p-chlorophenylborazole.

EXAMPLE 8

Preparation of B-dimethyl-N-triphenylborazole

B-dimethyl-N-triphenylborazole is obtained in the manner described under Example 6 except that two molar equivalents (0.02 mole) of diazomethane are used as a reactant with 0.01 mole of N-triphenylborazole, and the reaction mass is allowed to stand for 11 days at −78° C. At the end of this period of time the reaction mass is still yellow, indicating that not all of the diazomethane has been consumed. The crude product (74% yield) has M.P. 175°–183° C., which is raised to M.P. 185°–191° C. by recrystallization from hexane.

Purification of a similarly prepared compound by chromatography on a column of alumina, followed by an additional recrystallization from hexane, gives an analytical sample, M.P. 205°–207° C., of B-dimethyl-N-triphenylborazole.

*Analysis.*—Calc'd. for $C_{20}H_{22}N_3B_3$, percent: C, 71.31; H, 6.58; N, 12.47; B, 9.63. Found, percent: C, 71.17; H, 6.18; N, 12.84; B, 9.72.

EXAMPLE 9

Preparation of B-dimethyl-N-tri-(3,4-dibutoxyphenyl)borazole

Instead of 0.01 mole of N-triphenylborate as in Example 8, there is employed 0.01 mole of N-tri-(3,4-dibutoxyphenyl)borazole to obtain a good yield of B-dimethyl-N-tri-(3,4-dibutoxyphenyl)borazole.

EXAMPLE 10

Preparation of B-trimethyl-N-triphenylborazole

The mixture, obtained upon adding 46 ml. of a 0.084 molar ethereal solution of diazomethane (3.84 millimoles) to 1.01 grams (3.0 millimoles) of B-dimethyl-N-triphenylborazole in 100 ml. of ether at −78° C., is allowed to stand at this temperature for seven days. Even at the end of this period of time, all of the diazomethane has not been consumed. After being warmed to room temperature (20°–30° C.) and being filtered, the mixture is evaporated to dryness, leaving crude B-trimethyl-N-triphenylborazole (M.P. 240°–246° C.) as a residue. The product is purified by recrystallization from a mixture of benzene-hexane, followed by chromatography on a column of alumina.

EXAMPLE 11

*Preparation of B-methyl-N-tri-m-tolylborazole*

The reaction of N-tri-m-tolylborazole and diazomethane is carried out in essentially the same manner as described under Example 10 with reference to the preparation of B-trimethyl-N-triphenylborazole by reacting B-dimethyl-N-triphenylborazole with diazomethane. The product, B-methyl-N-tri-m-tolylborazole, is purified by recrystallization from hexane; M.P. 137°–138° C.

*Analysis.*—Calc'd. for $C_{22}H_{26}N_3B_3$, percent: C, 72.41; H, 7.18; N, 11.52; B, 8.90. Found, percent: C, 71.87; H, 7.14; N, 11.51; B, 8.46.

Nuclear magnetic resonance data: Calc'd. for: aromatic —H=12; (m—$CH_3$)—H=9; (B—$CH_3$)—H=3. Found: aromatic —H=12; (m—$CH_3$)—H=9.5; (B—$CH_3$)—H=3.1.

EXAMPLE 12

*Preparation of B-dimethyl-N-tri-p-bromophenylborazole*

A mixture of N-tri-p-bromophenylborazole (2.0 g.; 3.67 millimoles) and diazomethane (7.31 millimoles) in 275 ml. of ether is allowed to stand at —78° C. for 6 days and then is warmed to room temperature (20°–30° C.). Evaporation of the ether leaves 1.30 g. of solid product comprising B-dimethyl-N-tri-p-bromophenylborazole, M.P. 209°–210.5° C. Recrystallization from hexane raises the melting point to 211°–213° C.

*Analysis.*—Calc'd. for $C_{20}H_{19}N_3B_3Br_3$, percent: C, 41.88; H, 3.34; N, 7.33; B, 5.66; Br, 41.80. Found, percent: C, 41.86; H, 3,28; N, 7.60; B, 5.43; Br, 41.66.

EXAMPLE 13

*Preparation of B-dimethyl-N-tri-B-naphthylborazole*

The subject compound is obtained from the reaction of N-tri-B-naphthylborazole and diazomethane in ether solution at —50° C. using a reaction time of 6 days. The molar proportions of reactants and the procedure for carrying out the reaction are essentially the same as that described under Example 8 with reference to the preparation of B-dimethyl-N-triphenylborazole.

Instead of N-tri-B-naphthylborazole in the above example, one can use an equivalent amount of any of the N-tri-B-halogenated (e.g., chlorinated, brominated, etc.) naphthylborazoles or of any of the N-tri-B-alkoxy-substituted-naphthylborazoles.

EXAMPLE 14

*Preparation of B-methyl-N-tri-p-tolylborazole*

To a solution of 2.0 g. (5.7 millimoles) of N-tri-p-tolylborazole in 300 ml. of ether, cooled to —78° C., is added 30 ml. of an ether solution of diazomethane (0.38 millimole/ml.). The yellow reaction mass is allowed to stand at —78° C. for 70 hours and then warmed to room temperature (20°–30° C.). The solvent is evaporated under reduced pressure and the residue recrystallized from hexane. White needles of M.P. 150°–151° C. are obtained which depress to M.P. 135°–148° C. the melting point of the starting material (M.P. 150°–152° C.) on admixture. An additional recrystallization from hexane does not change the melting point.

*Analysis.*—Calc'd. for $C_{22}H_{26}N_3B_3$, percent: C, 72.41; H, 7.18; N, 11.52; B, 8.90. Found, percent: C, 71.30; H, 7.18; N, 11.53; B, 8.73.

The nuclear magnetic resonance spectrum of the compound: Calc'd. for: aromatic—H=12; (m—$CH_3$)—H=9; (B—$CH_3$)—H=3. Found: aromatic —H=12; (m—$CH_3$)—H=9.6; (B—$CH_3$)—H=3.2.

EXAMPLE 15

*Preparation of B-methyl-N-tri-p-anisylborazole*

Using 0.015 mole of diazomethane and 0.01 mole of N-tri-p-anisylborazole, essentially the same procedure is followed in making the subject compound as is described under Example 6 with reference to the preparation of B-methyl-N-triphenylborazole.

The substituted borazoles produced by the method of this invention are useful in fields of presently known utility for this class of compounds. Such fields are exemplified by those disclosed in issued patents (also in scientific and other journals), for example in U.S. Patents 2,796,411 and 2,821,463.

I claim:

1. A method of producing a borazole represented by the formula

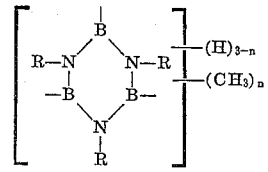

where R represents a member of the class consisting of aromatic hydrocarbon, nuclearly halogenated aromatic hydrocarbon and nuclearly alkoxy-substituted aromatic hydrocarbon; and $n$ represents a number from 1 to 3, inclusive, said method comprising effecting reaction between (1) a borazole represented by the formula

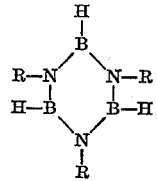

where R has the same meaning as given above and (2) diazomethane in a molar amount represented by $n$ where $n$ has the same meaning as given above, said reaction being effected under anhydrous conditions, in an inert liquid ether and at a temperature below about —50° C.; and isolating a borazole represented by the first-given formula from the resulting reaction mass.

2. A method as in claim 1 wherein the inert liquid ether is diethyl ether.

3. A method as in claim 1 wherein the reaction is effected at a temperature below about —70° C.

4. A method as in claim 1 wherein R represents the phenyl radical, $C_6H_5$—.

5. A method as in claim 1 wherein R represents the tolyl radical, $CH_3C_6H_4$—.

References Cited in the file of this patent

Turner: Chemistry and Industry, Oct. 25, 1958, page 1405.

UNITED STATES PATENT OFFICE
CERTIFICATE OF CORRECTION

Patent No. 2,998,449                      August 29, 1961

Stanley F. Stafiej

It is hereby certified that error appears in the above numbered patent requiring correction and that the said Letters Patent should read as corrected below.

Column 2, line 56, for "borozole" read -- borazole --; column 4, line 21, after "and" insert -- of --; line 59, for "N-triphenylborate" read -- N-triphenylborazole --; column 5, line 35, for "3,28" read -- 3.28 --.

Signed and sealed this 6th day of March 1962.

(SEAL)
Attest:

ERNEST W. SWIDER
Attesting Officer

DAVID L. LADD
Commissioner of Patents